(No Model.)
A. R. MOORE.
LAND MARKER.
No. 600,590. Patented Mar. 15, 1898.
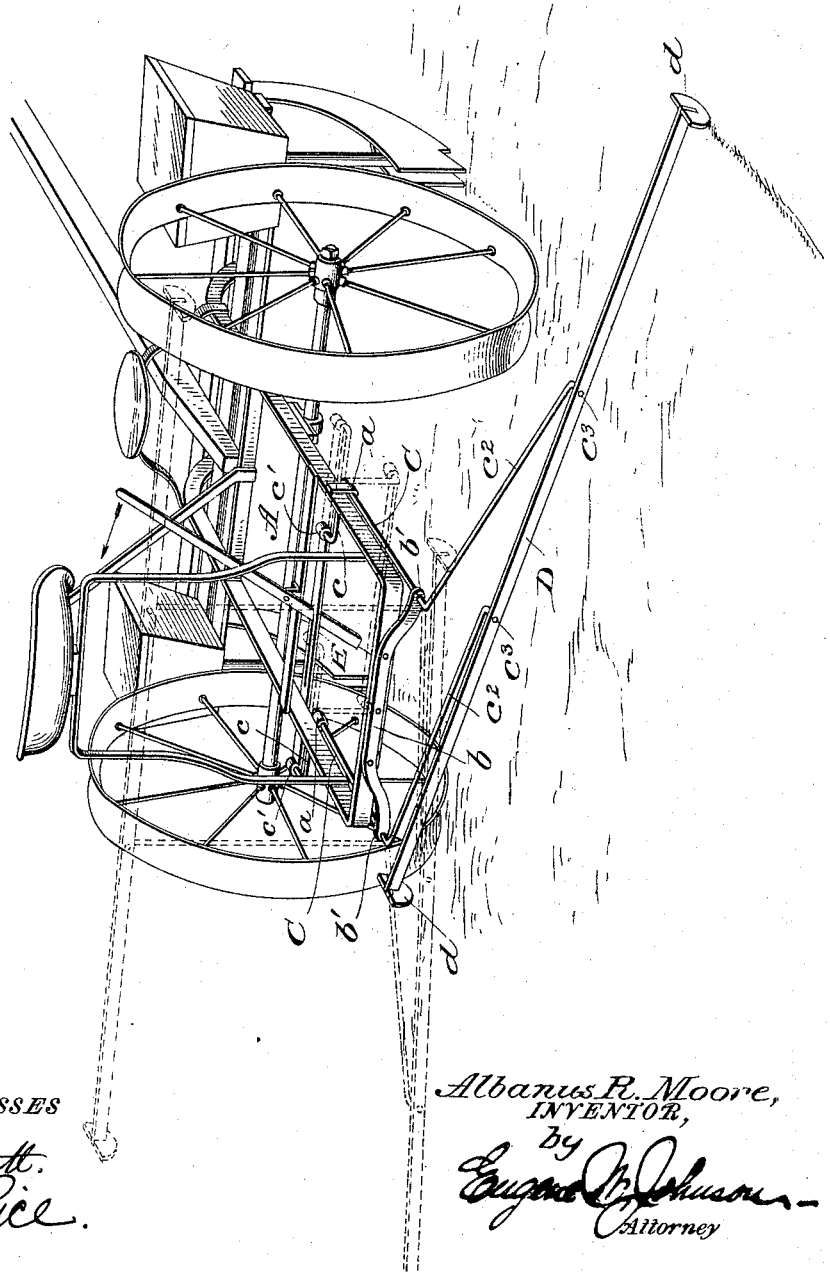
WITNESSES
L. S. Elliott.
D. L. Rice.
Albanus R. Moore,
INVENTOR,
by
Eugene W. Johnson
Attorney

UNITED STATES PATENT OFFICE.

ALBANUS R. MOORE, OF MEDORA, ILLINOIS.

LAND-MARKER.

SPECIFICATION forming part of Letters Patent No. 600,590, dated March 15, 1898.

Application filed October 27, 1897. Serial No. 656,525. (No model.)

*To all whom it may concern:*

Be it known that I, ALBANUS R. MOORE, a citizen of the United States of America, residing at Medora, in the county of Macoupin and State of Illinois, have invented certain new and useful Improvements in Land-Markers; and I do hereby declare the following to be a full, clear, and exact description of the invention, such as will enable others skilled in the art to which it appertains to make and use the same, reference being had to the accompanying drawing, and to letters of reference marked thereon, which form a part of this specification.

This invention relates to certain new and useful improvements in land-markers of that type which are applied to seed or corn planters for laying off the ground as the planter is drawn across the field, so that the rows may be equally spaced.

The object of my invention is to provide a simple, cheap, and effective land-marker which can be readily applied to planters and can be operated from the driver's seat.

In the accompanying drawing the figure is a perspective view showing my invention applied to a corn-planter of the ordinary type, the marker being shown in two positions in full and dotted lines.

A refers to the wheel-frame of the planter, to which is attached the runner frame in the usual manner. The frame A extends rearwardly, so as to project a suitable distance beyond the main supporting-wheels. Said frame has parallel side members and carries the usual driver's and dropper's seats. To the side bars of the main frame A are bolted or otherwise secured bearing-loops $a$ $a$, and a bar or frame $b$ is suitably secured to the rear end of the frame A, which bar or frame $b$ has on a line with the bearing-loops $a$ eyes or loops $b'$.

C refers to a pair of crank-arms having at their forward ends bent members $c$, with forwardly-projecting portions $c'$, and at their rear members $c^2$, the ends $c^3$ of which are bent rearwardly and pass through perforations in the marking-bar D, said bar carrying at its ends the usual shoes $d$ $d$. The forwardly-projecting members or portions of the crank-arm C are connected to each other by a cross piece or strap E, which may be connected in any suitable manner to a lever which is adapted to impart a downward and side movement to the cross-piece E when moved in the proper direction.

The crank-arms C are adapted to turn in the bearing-loops $a$ and eyes $b'$ of the frame $b$, and it will be noted that when the crank-arms are turned that they will carry the marking-bar, which bar is held in position for marking by reason of the cross piece or strap engaging with the under side of the frame A, such engagement holding one of the crank-arms in such position that its bent members will be substantially horizontal, while the members of the other crank-arm may incline, which movement is allowed by reason of a rocking movement of the connecting-bar E, the same having a fulcrum on the under side of the frame A. The marking-bar when in a position for use will have one end raised and the other end lowered; but when it is desired to transport the planter without using the marker the connecting-piece E is depressed, which moves the short members of the crank-arms to a vertical position, said members depending, while the rear or longer members assume a vertical position and carry the marker in a raised position, as shown in dotted lines.

The device hereinbefore described is simple and may be applied to corn-planters as usually constructed, and an operating-lever may be entirely dispensed with, as the forward connecting-strap E may be operated by the foot of the driver.

Having thus described my invention, what I claim as new, and desire to secure by Letters Patent, is—

1. In combination with a frame mounted on wheels, of a pair of crank-arms connected to the frame, and to each other by a cross-bar, a marker attached to the rear members of the crank-arms, substantially as shown and for the purpose set forth.

2. In a land-marker, the combination with a frame having bearings secured thereto, of a pair of crank-arms each having short forward members which are connected to each other, and long rear members which engage with a bar, said bar carrying at its ends shoes, substantially as shown and for the purpose set forth.

3. In a land-marker, the combination with a planter-frame having parallel side bars, of a pair of crank-arms journaled thereto, a marker-bar attached to the rear members of the crank-arms, and a bar connecting the forward members with each other said bar engaging with the under side of the frame when the marker-bar is in an operative position, substantially as shown and for the purpose set forth.

In testimony whereof I affix my signature in presence of two witnesses.

ALBANUS R. MOORE.

Witnesses:
T. HUBBARD,
W. A. ARMOUR.